United States Patent
Wu et al.

(10) Patent No.: US 7,545,871 B2
(45) Date of Patent: Jun. 9, 2009

(54) DISCRETE MULTI-TONE SYSTEM HAVING DHT-BASED FREQUENCY-DOMAIN EQUALIZER

(75) Inventors: Chih-Feng Wu, Taipei (TW); Muh-Tian Shiue, Jhongli (TW); Chorng-Kuang Wang, Taipei (TW); An-Yeu Wu, Taipei (TW)

(73) Assignee: National Taiwan University, Taipei (TW)

( * ) Notice: Subject to any disclaimer, the term of this patent is extended or adjusted under 35 U.S.C. 154(b) by 580 days.

(21) Appl. No.: 11/361,374

(22) Filed: Feb. 24, 2006

(65) Prior Publication Data

US 2007/0201574 A1     Aug. 30, 2007

(51) Int. Cl.
*H04L 27/28* (2006.01)
*H04B 1/10* (2006.01)
(52) U.S. Cl. ...................... 375/260; 375/350
(58) Field of Classification Search .............. 375/260, 375/261, 316, 324, 350; 708/400, 404, 405
See application file for complete search history.

(56) References Cited

U.S. PATENT DOCUMENTS

2006/0085497 A1* 4/2006 Sehitoglu .................. 708/405
2007/0064824 A1* 3/2007 Wang et al. ................. 375/260
2007/0263741 A1* 11/2007 Erving et al. ............... 375/260
2008/0037666 A1* 2/2008 Tzannes ..................... 375/260

* cited by examiner

*Primary Examiner*—Don N Vo (57) ABSTRACT

A discrete multi-tone (DMT) communication system is provided herein, replacing the conventional inversed discrete Fourier transform (IDFT) and DFT with IDHT (together with the complex-to-real transformation) and a DHT alone respectively at the transmitting end and the receiving end. A DHT-based frequency-domain equalizer (FEQ) at the receiving end equalizes each of the 0-th to (N–1)-th DHT subchannels, where N is the number of point of the DHT. Finally, each of the 0-th to $$\left(\frac{N}{2}-1\right)-th$$

subchannels of the DMT system is obtained by combining the k-th and (N-k)-th subchannels of the DHT-based FEQ for k=0, 1, ... , $$\left(\frac{N}{2}-1\right).$$

13 Claims, 6 Drawing Sheets

DISCRETE MULTI-TONE SYSTEM HAVING DHT-BASED FREQUENCY-DOMAIN EQUALIZER

BACKGROUND OF THE INVENTION

1. Field of the Invention

The present invention generally relates to discrete multi-tone communication systems, and more particularly to a discrete multi-tone communication system using discrete Hartley transform for modulation and demodulation.

2. The Prior Arts

Figure 1:
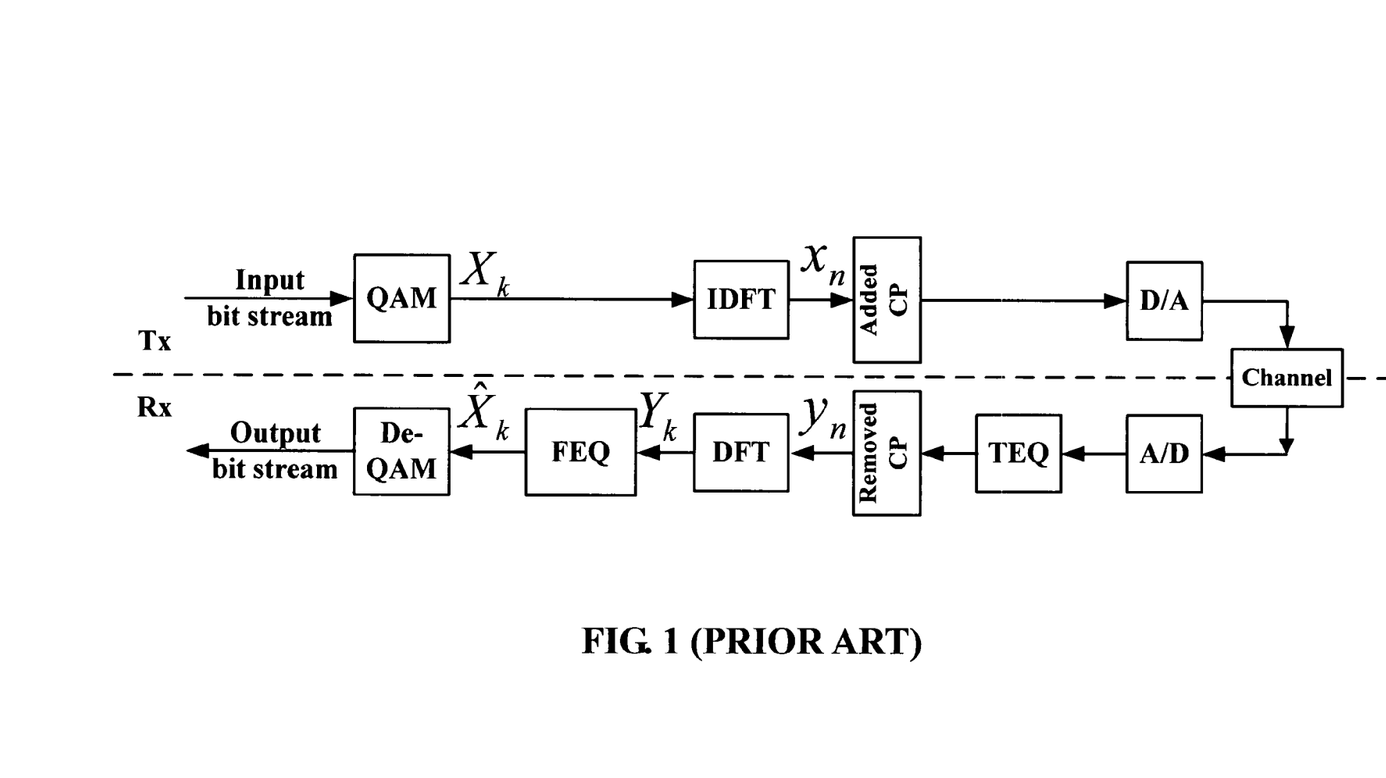
FIG. 1 is a schematic diagram showing a conventional DFT-based DMT system for xDSL.

Discrete multi-tone (DMT) is a multi-carrier modulation (MCM) technique commonly applied in wireline communications such as digital subscriber loops (xDSL) including ADSL, ADSL2, ADSL2+, and VDSL, and power-line communications such as HomePlug. The basic idea of DMT is that a large number of sinusoids (i.e., subcarriers) are modulated by complex-valued quadrature amplitude modulation (QAM) symbols derived from an input bit stream, and transmitted in parallel. Performing a modulation on the complex valued constellation points generates samples of the continuous-time signal to be transmitted during a DMT symbol period. At the receiver, the QAM symbols are recovered by performing a demodulation on the analog-to-digital-converted received signal. A typical DMT system for xDSL is shown in FIG. 1. As illustrated, discrete Fourier transform (DFT) and IDFT (i.e., Inversed DFT) are adopted for baseband demodulation and modulation for the DMT system in the receiving end (Rx) and transmitting end (Tx) (separated by the dashed line in FIG. 1) respectively. A pair of digital-to-analog (D/A) converter and an analog-to-digital (A/D) converter is also provided around the analog communication channel. A time-domain equalizer (TEQ) is used at the receiving end to shorten the channel dispersion and, thereby, minimize intersymbol interference (ISI) caused by channel distortion resulted from, for example, long loop length, gauge variation, and bridge-tap. In addition, to compensate the phase rotation and amplitude distortion existing on each subchannel in the frequency domain, a frequency-domain equalizer (FEQ) is deployed. Also, to guard against the ISI, cyclic prefix (CP) are added and removed at the transmitting end and the receiving end, respectively.

The modulation and demodulation operations performed by the IDFT and DFT can be expressed mathematically as follows:

$$IDFT: x_n = \frac{1}{N}\sum_{k=0}^{N-1} X_k \cdot W_N^{-kn}, n = 0, 1, \ldots, N-1 \quad (1)$$

$$DFT: Y_k = \sum_{n=0}^{N-1} y_n \cdot W_N^{kn}, k = 0, 1, \ldots, N-1 \quad (2)$$

where $$W_N = e^{-j\frac{2\pi}{N}},$$

$X_k$ or $Y_k$ is the complex transmission symbol on the k-th subchannel in frequency domain, $x_n$ or $y_n$ is the n-th transmission sample in time domain, and N is the number of points for the IDFT/DFT.

Figure 2:
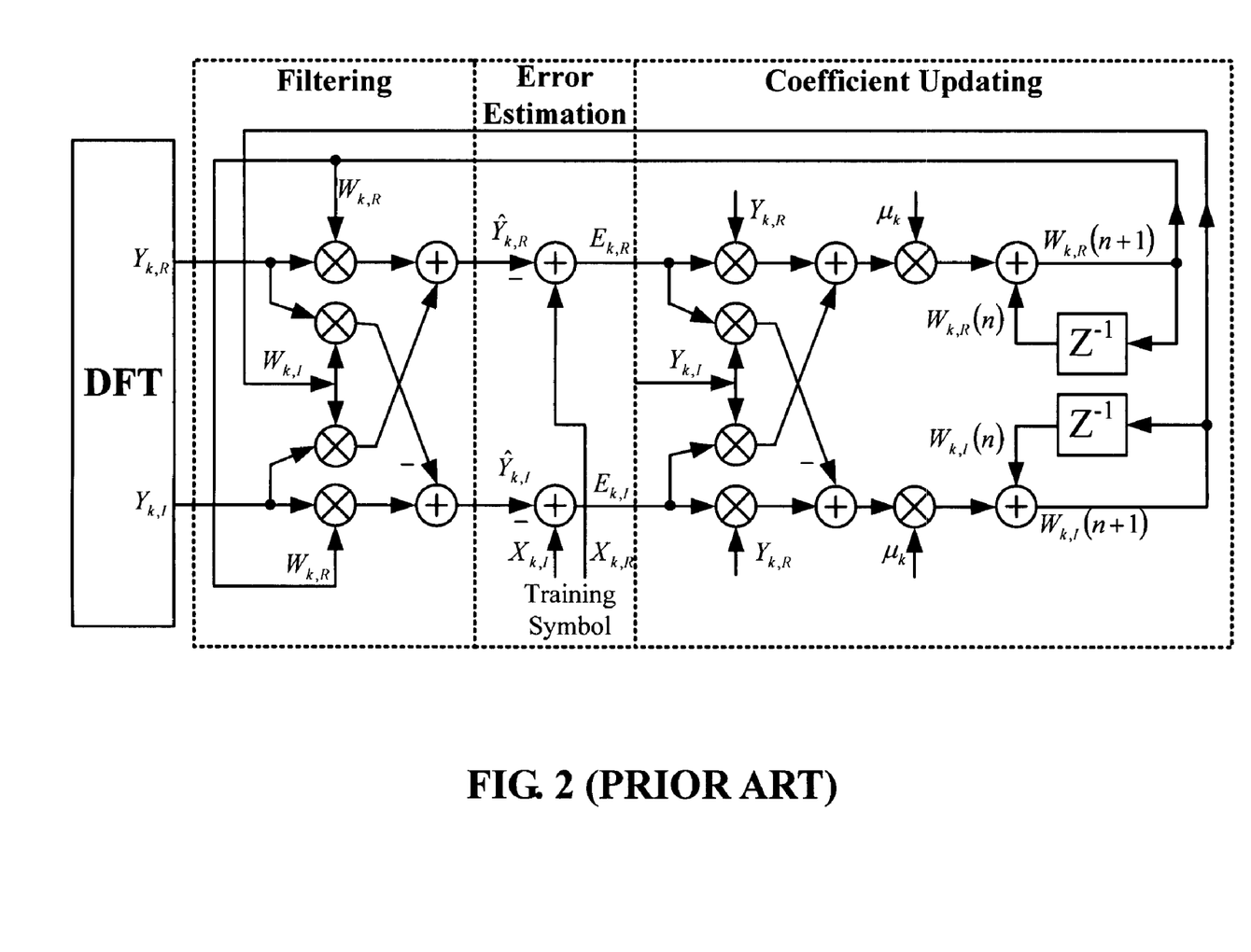
FIG. 2 is a schematic diagram showing an embodiment of the DFT-based FEQ of FIG. 1.

The FEQ or, as it is used behind the DFT, the DFT-based FEQ can be implemented using various algorithms. For example, the MMSE (minimum mean-square error) algorithm tries to minimize the estimated error between the equalized signal and the transmitted signal. Among these algorithms, the LMS (least mean square) algorithm is most popular in terms of VLSI implementation. The LMS algorithm in the DFT-based FEQ consists of three operations: filtering, error estimation, and coefficient updating, expressed mathematically as follows:

$$\text{Filtering: } \hat{Y}_k = Y_k \cdot W_k^* = (Y_{k,R} + jY_{k,I}) \cdot (W_{k,R} - jW_{k,I}) \quad (3)$$

$$\text{Error estimation: } E_k = X_k - \hat{Y}_k \quad (4)$$

$$\text{Coefficient Updating: } W_k(n+1) = W_k(n) + \mu_k Y_k E_k^* \quad (5)$$

where the subscripts R and I represent the real part and imaginary part of a complex number respectively, the superscript asterisk (*) denotes the complex conjugate operation, $Y_k$ is the DFT output, $X_k$ is the training symbol of the k-th subchannel of the DMT system, $W_k$ is the FEQ coefficient of the k-th subchannel, and $\mu_k$ is the updating step-size of the FEQ for the k-th subchannel. An embodiment of the DFT-based FEQ is illustrated in FIG. 2.

Prior arts have suggested replacing the DFT with discrete Hartley transform (DHT) so as to reduce the computing complexity from complex to real multiplication involved in DFT, as DHT itself is real-valued operation. With such a substitution, the DFT-based DMT system shown in FIG. 1 would become a DMT system illustrated in FIG. 3, where the modulation at the transmitting end is realized by the inverse DHT (IDHT) with a preceding complex-to-real transformation (C2RT), and the demodulation at the receiving end is realized by DHT with a succeeding real-to-complex transformation (R2CT). C2RT is required to transform the complex symbol $X_k$ into the real symbol $H_k$; and R2CT is required to transform the real symbol $\tilde{H}_k$ to the complex symbol $Y_k$. Please note that the DFT-based FEQ still has to be adopted in the DHT-based DMT system of FIG. 3, as basically the FEQ architecture remains the same.

Figure 3:
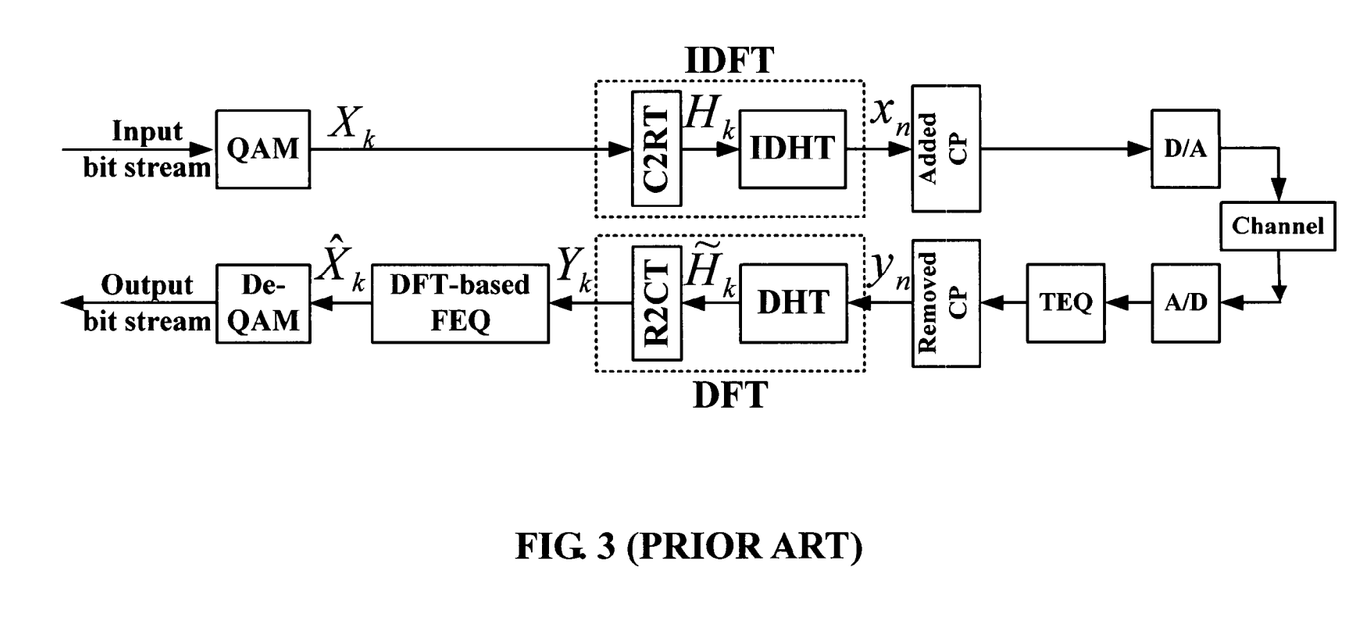
FIG. 3 is a schematic diagram showing a conventional DFT-based DMT system for xDSL realized by DHT.

The modulation and demodulation operations performed by the IDHT and DHT can be expressed mathematically as follows:

$$IDHT: x_N = \frac{1}{N}\sum_{k=0}^{N-1} H_k \cdot cas(2\pi nk/N), n = 0, 1, \ldots, N-1 \quad (6)$$

$$DHT: \tilde{H}_k = \sum_{n=0}^{N-1} y_n \cdot cas(2\pi nk/N), k = 0, 1, \ldots, N-1 \quad (7)$$

where $cas(\cdot) = cos(\cdot) + sin(\cdot)$, and N is the number of points for the IDHT/DHT and is the same as that for the IDFT/DFT. Similarly, the C2RT and R2CT can be expressed as follows:

$$C2RT: H_k = X_{k,R} - X_{k,I} \quad (8)$$

$$R2CT: Y_k = Y_{k,R} + jY_{k,I} = \tilde{H}_{k,E} - j\tilde{H}_{k,O} \quad (9)$$

where $\tilde{H}_{k,E}$ and $\tilde{H}_{k,O}$ are the even and odd parts of the $\tilde{H}_k$ respectively, which can be obtained by:

$$\tilde{H}_{k,E} = \frac{\tilde{H}_k + \tilde{H}_{N-k}}{2} \tag{10}$$

$$\tilde{H}_{k,O} = \frac{\tilde{H}_k - \tilde{H}_{N-k}}{2} \tag{11}$$

SUMMARY OF THE INVENTION

A DMT system is provided herein. As described above, in practice, the IDFT and DFT of a conventional DMT system can be replaced by the IDHT with a preceding complex-to-real transformation (C2RT), and by the DHT with a succeeding real-to-complex transformation (R2CT) at the transmitting end and the receiving end respectively. With the present invention, the DFT and the DFT-based FEQ at the receiving end of a conventional DMT system is replaced by the DHT and a DHT-based FEQ, omitting the use of R2CT.

At the transmitting end, the DMT system of the present invention performs modulation either by IDFT or by the IDHT along with C2RT while, at the receiving end, the demodulation is just realized by the DHT. The DHT-based FEQ directly equalizes each of the 0-th to (N−1)-th, subchannels output from the DHT as R2CT is omitted, where N is the number of points of DHT. Finally, each of the 0-th to $$\left(\frac{N}{2} - 1\right)\text{-th}$$

subchannels of the DMT system is obtained by combining the k-th and (N-k)-th subchannels of the DHT-based FEQ for k=0, 1, ... , $$\left(\frac{N}{2} - 1\right).$$

The LMS algorithm can also be adopted for the DHT-based FEQ, which is very suitable for VLSI implementation. The LMS algorithm of the DHT-based FEQ also contains the filtering, error estimation and coefficient updating operations.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 4A:
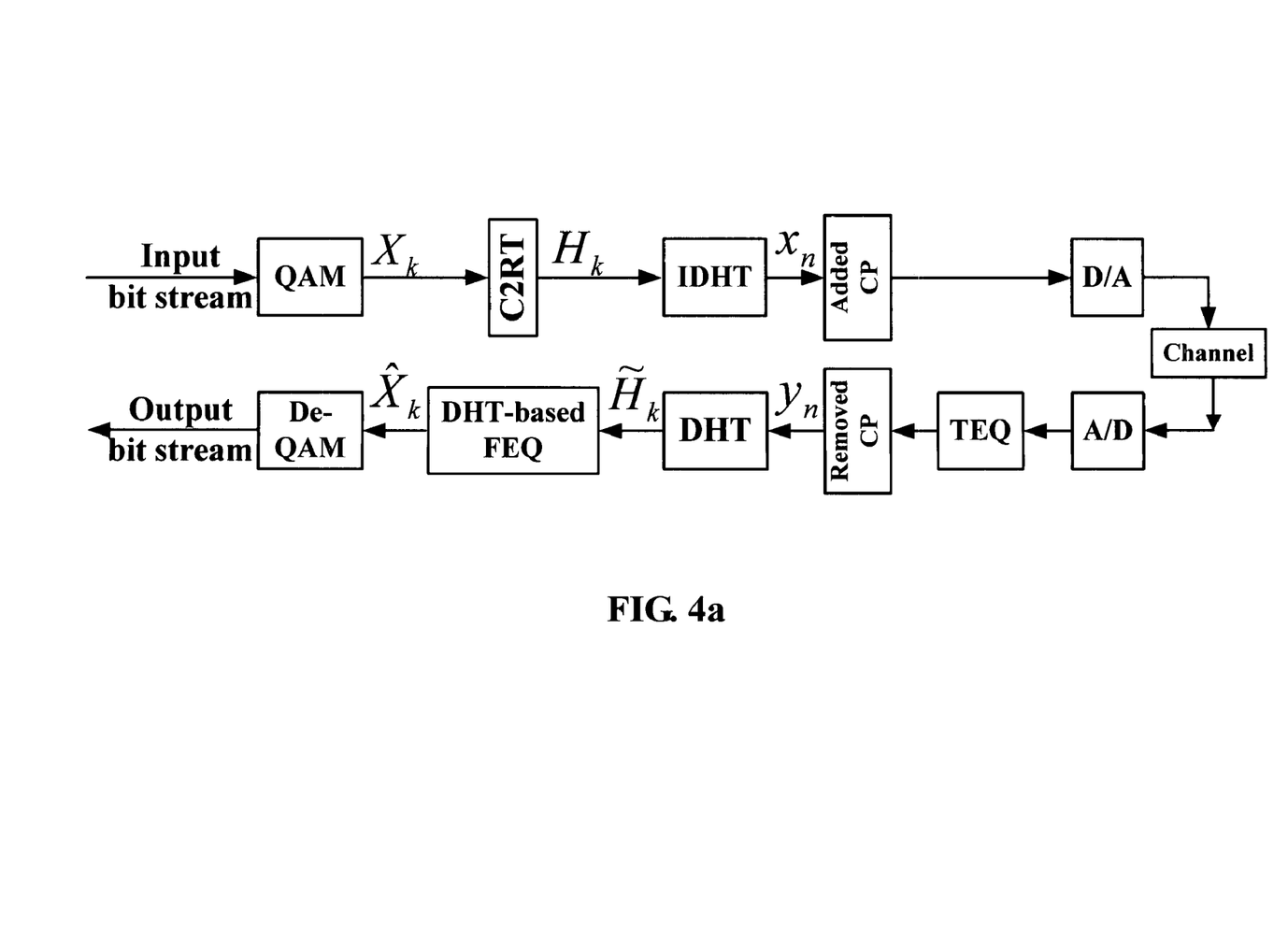
FIG. 4a is a schematic diagram showing a DMT system for xDSL according to a first embodiment of the present invention.
Figure 4B:
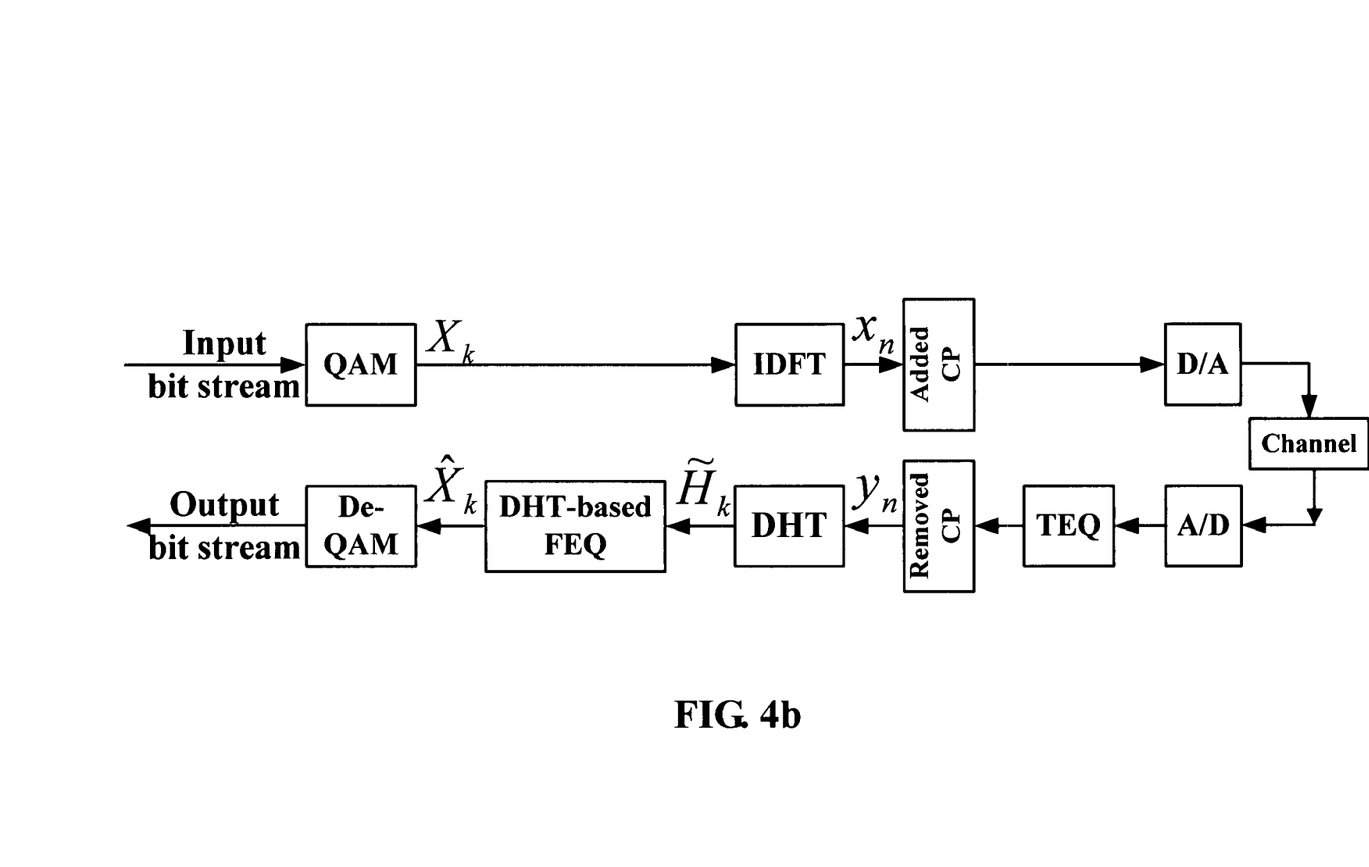
FIG. 4b is a schematic diagram showing a DMT system for xDSL according to a second embodiment of the present invention.

FIGS. 4a and 4b are schematic diagrams showing a DMT system for xDSL according to two embodiments of the present invention. As illustrated, at the transmitting end, the modulation can be realized either by IDFT alone or by IDHT with a preceding C2RT. In the following, for simplicity, the first embodiment of FIG. 4a will be used as an example. Please note that, even though the application of the present invention to xDSL is presented throughout the specification, the present invention can actually be applied to various communication systems, now known or later developed.

As illustrated, the DMT system of the present invention is similar to the prior arts in terms of architecture where, at the transmitting end, the system of the present invention performs modulation by the C2RT plus IDHT while, at the receiving end, the demodulation is now realized by the DHT only, omitting the R2CT. A major characteristic of the present invention is that a DHT-based FEQ is invented and employed to directly equalize each of the real-valued 0-th to (N−1)-th subchannels (i.e., $\tilde{H}_k$ of eq. (7)) output from the DHT.

The mathematical model for the DHT-based FEQ has been derived by the present inventor based on the MMSE criteria as the cost function of the equalization's residual error, and is presented in "DHT-Based Frequency Domain Equalizer for DMT Systems" in Proceedings of European Signal Processing Conference (Proc. of EUSIPCO'05). Using the LMS algorithm, the mathematical model of the DHT-based FEQ is as follows, which also contains the filtering, error estimation, and coefficient updating operations:

Filtering:

$$\begin{bmatrix} \hat{Y}_{k,R} \\ \hat{Y}_{k,I} \end{bmatrix} = \begin{bmatrix} S_k & C_k \\ -C_k & S_k \end{bmatrix} \cdot \begin{bmatrix} \tilde{H}_k \\ \tilde{H}_{N-k} \end{bmatrix}, k = 0, 1, \ldots, \frac{N}{2} - 1 \tag{12}$$

$$\hat{Y}_k = \hat{Y}_{k,R} + j\hat{Y}_{k,I}$$

Error estimation:

$$E_k = X_k - \hat{Y}_k, k = 0, 1, \ldots, \frac{N}{2} - 1 \tag{13}$$

Coefficient Updating:

$$\begin{bmatrix} S_k(n+1) \\ C_k(n+1) \end{bmatrix} = \begin{bmatrix} S_k(n) \\ C_k(n) \end{bmatrix} + \mu_k \cdot \begin{bmatrix} \tilde{H}_k E_{k,R} + \tilde{H}_{N-k} E_{k,I} \\ \tilde{H}_{N-k} E_{k,R} + \tilde{H}_k E_{k,I} \end{bmatrix}, \tag{14}$$

$$k = 0, 1, \ldots, \frac{N}{2} - 1$$

where the subscripts R and I represent the real part and imaginary part of a complex number respectively, $\tilde{H}_k$ and $\tilde{H}_{N-k}$ are k-th and (N-k)-th subchannels output from DHT, $X_k$ is the training symbol of the k-th subchannel of the DMT system, $\hat{Y}_k$ is the k-th subchannel output from the DHT-based FEQ, $\mu_k$ is the updating step-size of the DHT-based FEQ. In an embodiment of the present invention, the coefficients $S_k$ and $C_k$ can be derived from $W_{k,R}$ and $W_{k,I}$, which are the real and imaginary part of coefficients $W_k$ from the DFT-based FEQ as follows:

$$S_k = \frac{W_{k,R} - W_{k,I}}{2};$$

and $$C_k = \frac{W_{k,R} + W_{k,I}}{2}.$$

In an alternative embodiment, the coefficient updating operation can also be carried out as follows:

$$\begin{bmatrix} S_k(n+1) \\ C_k(n+1) \end{bmatrix} = \begin{bmatrix} S_k(n) \\ C_k(n) \end{bmatrix} + \mu_k \cdot \begin{bmatrix} \tilde{H}_k \cdot \text{sgn}(E_{k,R}) + \tilde{H}_{N-k} \cdot \text{sgn}(E_{k,I}) \\ \tilde{H}_{N-k} \cdot \text{sgn}(E_{k,R}) + \tilde{H}_k \cdot \text{sgn}(E_{k,I}) \end{bmatrix},$$

$$k = 0, 1, \ldots, \frac{N}{2} - 1$$

where sgn(x) is the x's quantized value, which represents a +1 if the x≧0 and −1 if x<0.

Figure 5:
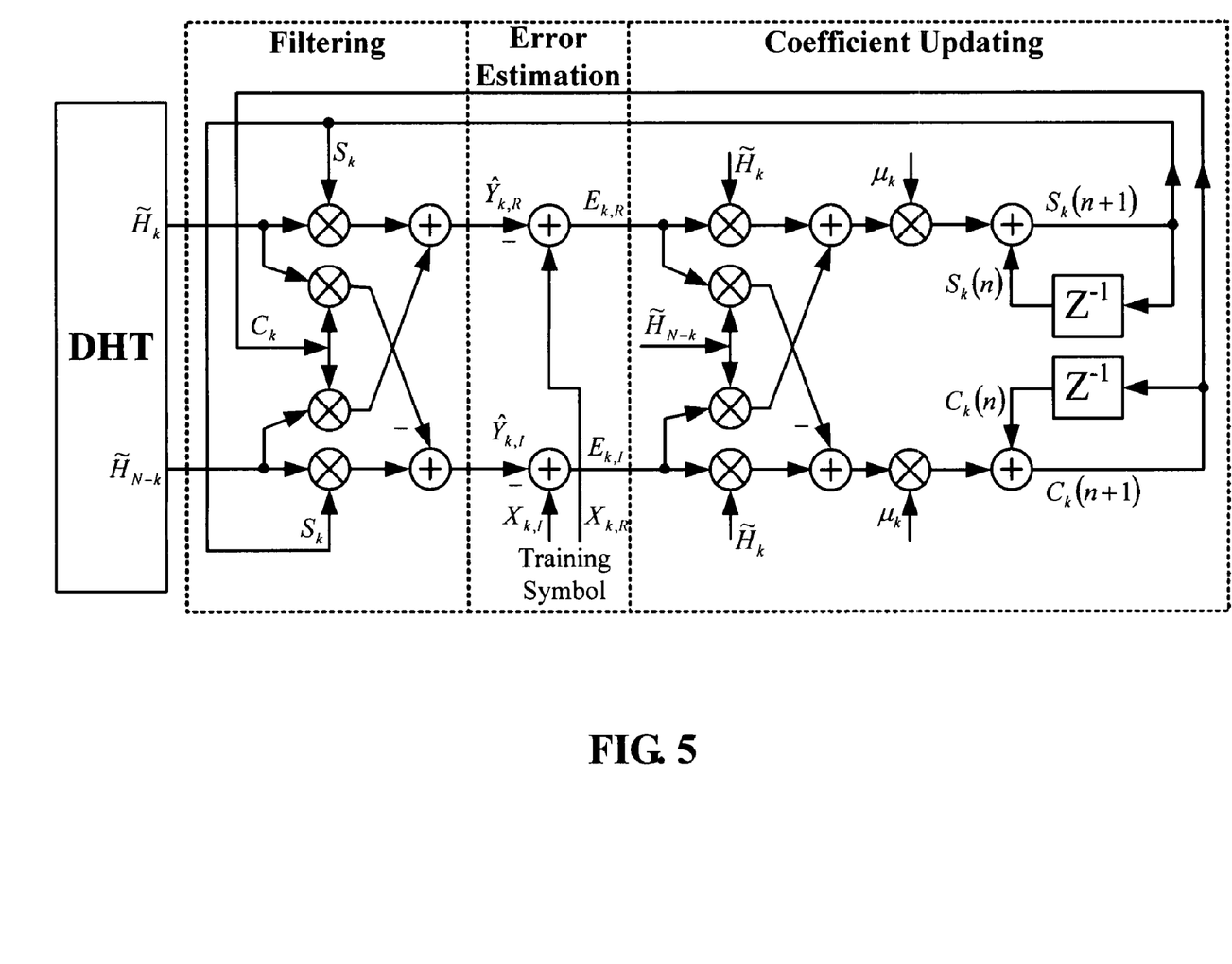
FIG. 5 is a schematic diagram showing an embodiment of the DHT-based FEQ of FIGS. 4a and 4b.

An embodiment of the DHT-based FEQ is illustrated in FIG. 5. At last, each of the 0-th to $$\left(\frac{N}{2} - 1\right)\text{-th}$$

subchannels of the DMT system is obtained by combining the k-th and (N-k)-th subchannels of the DHT-based FEQ for k=0, 1, . . . , $$\left(\frac{N}{2} - 1\right).$$

A comparison of the computing complexity for a single tone operation between the conventional approach (DHT+R2CT along with DFT-based FEQ) and the present invention (DHT+DHT-based FEQ) along the receive path is listed in Table 1:

TABLE 1

| Comparison in Computing Complexity | | | DHT + R2CT DFT-based FEQ | DHT DHT-based FEQ |
|---|---|---|---|---|
| Receive Path Computing Complexity | | | | |
| LMS-based FEQ | R2CT | + | 2 | — |
| | Filtering | × | 4 | 4 |
| | | + | 2 | 2 |
| | Error Estimation | + | 2 | 2 |
| | Updating | × | 4 | 4 |
| | | + | 4 | 4 |

In Table 1, the R2CT is considered only requiring 2-addition for each tone since the ½-term in Eq. (10) and (11) can be ignored for VLSI realization. From Table 1, it can be seen that the computing complexity of the DHT-based FEQ is the same as the DFT-based FEQ. In addition, it could be concluded that the present invention requires less computing complexity as it omits the 2N-addition (2 for each tone) of the R2CT.

Simulation results of data rates on a number of test loops under the conventional approach (DHT+R2CT along with DFT-based FEQ) and the present invention (DHT+DHT-based FEQ) are listed in Table 2:

TABLE 2

| | Simulation Results | |
|---|---|---|
| | Case I | Case II |
| | DHT + R2CT | DHT |
| | DFT-based FEQ | DHT-based FEQ |
| Test Loop | REVERB(kbps) | |
| T1.601 Loop#7 | 3556 | 3556 |
| T1.601 Loop#9 | 4560 | 4560 |
| T1.601 Loop#13 | 4408 | 4408 |
| CSA Loop#4 | 9864 | 9864 |
| CSA Loop#6 | 9272 | 9272 |
| CSA Loop#7 | 9176 | 9176 |
| CSA Loop#8 | 8496 | 8496 |
| mid-CSA Loop | 12664 | 12664 |

As illustrated, the DHT-based FEQ and the DFT-based FEQ have identical data rates. Also by performance analysis, it can be proved that the DHT-based FEQ and the DFT-based FEQ have identical subchannel signal-to-noise ratios (SNRs).

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An N (N>1)-point discrete multi-tone (DMT) system, comprising:

a transmitting end, said transmitting end having an inversed discrete Fourier transform (IDFT) operator accepting complex-valued symbols $X_k$ (k=0, 1, . . . , N−1) as input for modulation onto $x_n$ (n=0, 1, . . . , N−1) subchannels of said DMT system, said IDFT operator being characterized by equation:

$$x_n = \frac{1}{N} \sum_{k=0}^{N-1} X_k \cdot W_N^{-kn}, n = 0, 1, \ldots, N-1$$

where $$W_N = e^{-j\frac{2\pi}{N}};$$

and a receiving end, said receiving end having a discrete Hartley transform (DHT) operator for demodulation $y_n$ (n=0, 1, . . . , N−1) subchannels of said DMT system, and a DHT-based frequency-domain equalizer (FEQ) operator following said DHT operator for equalization, said DHT operator being characterized by equation:

$$\tilde{H}_k = \sum_{n=0}^{N-1} y_n \cdot cas(2\pi nk/N), k = 0, 1, \ldots, N-1,$$

where $cas(2\pi nk/N) = cos(2\pi nk/N) + sin(2\pi nk/N)$; and said DHT-based FEQ operator performing three operations: filtering, error estimation, and coefficient updating, said filtering operation being characterized by equation:

$$\begin{bmatrix} \hat{Y}_{k,R} \\ \hat{Y}_{k,I} \end{bmatrix} = \begin{bmatrix} S_k & C_k \\ -C_k & S_k \end{bmatrix} \cdot \begin{bmatrix} \tilde{H}_k \\ \tilde{H}_{N-k} \end{bmatrix}, k = 0, 1, \ldots, \frac{N}{2} - 1,$$

$$\hat{Y}_k = \hat{Y}_{k,R} + j\hat{Y}_{k,I}$$

said error estimation operation being characterized by equation:

$$E_k = X_k - \hat{Y}_k, k = 0, 1, \ldots, \frac{N}{2} - 1, \text{ and}$$

said coefficient updating operation being characterized by equation:

$$\begin{bmatrix} S_k(n+1) \\ C_k(n+1) \end{bmatrix} = \begin{bmatrix} S_k(n) \\ C_k(n) \end{bmatrix} + \mu_k \cdot M(\tilde{H}_k, \tilde{H}_{N-k}, E_k),$$

$$k = 0, 1, \ldots, \frac{N}{2} - 1,$$

where M is a matrix operator involving $E_k$, $\tilde{H}_k$ and $\tilde{H}_{N-k}$, $\tilde{H}_k$ and $\tilde{H}_{N-k}$ are the k-th and (N-k)-th subchannels output from said DHT operator, $X_k$ is the training symbol of the k-th subchannel of said DMT system, $\hat{Y}_k$ is the k-th subchannel output from said DHT-based FEQ operator, $\mu_k$ is the updating step-size of said DHT-based FEQ operator, and $S_k$ and $C_k$ are coefficients.

2. The DMT system according to claim 1, wherein said IDFT operator comprises an complex-to-real transformation (C2RT) operator accepting complex-valued symbols $X_k$ (k=0, 1, ..., N−1) as input, and an inverse DHT (IDHT) operator following said C2RT operator for modulation onto $x_n$ (n=0, 1, ..., N−1) subchannels of said DMT system; said C2RT operator is characterized by equation:

$$H_k = X_{k,R} - X_{k,I}; \text{ and}$$

said IDHT operator is characterized by equation:

$$x_n = \frac{1}{N} \sum_{k=0}^{N-1} H_k \cdot cas(2\pi nk/N), n = 0, 1, \ldots, N-1,$$

where $cas(2\pi nk/N) = cos(2\pi nk/N) + sin(2\pi nk/N)$ and the subscripts R and I represent the real part and imaginary part of a complex number.

3. The DMT system according to claim 1, wherein said coefficients $S_k$ and $C_k$ are derived from the coefficient $W_k$ of a discrete Fourier transform (DFT)-based FEQ as follows:

$$S_k = \frac{W_{k,R} - W_{k,I}}{2};$$

and $$C_k = \frac{W_{k,R} + W_{k,I}}{2}.$$

4. The DMT system according to claim 1, wherein said matrix operator M is:

$$\begin{bmatrix} \tilde{H}_k E_{k,R} + \tilde{H}_{N-k} E_{k,I} \\ \tilde{H}_{N-k} E_{k,R} + \tilde{H}_k E_{k,I} \end{bmatrix}.$$

5. The DMT system according to claim 1, wherein said matrix operator M is:

$$\begin{bmatrix} \tilde{H}_k \cdot sgn(E_{k,R}) + \tilde{H}_{N-k} \cdot sgn(E_{k,I}) \\ \tilde{H}_{N-k} \cdot sgn(E_{k,R}) + \tilde{H}_k \cdot sgn(E_{k,I}) \end{bmatrix},$$

where sgn(x) is an x's quantized value, which represents a +1 if x≧0 and −1 if x<0.

6. A receiver of a N (N>1)-point discrete multi-tone (DMT) system whose transmitter performs an inversed discrete Fourier transform (IDFT) operation for modulation, said receiver comprising a discrete Hartley transform (DHT) operator for demodulation $y_n$ (n=0, 1, ..., N−1) subchannels of said DMT system, and a DHT-based frequency-domain equalizer (FEQ) operator following said DHT operator for equalization, said DHT operator being characterized by equation:

$$\tilde{H}_k = \sum_{n=0}^{N-1} y_n \cdot cas\left(\frac{2\pi nk}{N}\right), k = 0, 1, \ldots, N-1,$$

where $cas(2\pi nk/N) = cos(2\pi nk/N) + sin(2\pi nk/N)$, said DHT-based FEQ operator performing three operations: filtering, error estimation, and coefficient updating, said filtering operation being characterized by equation:

$$\begin{bmatrix} \hat{Y}_{k,R} \\ \hat{Y}_{k,I} \end{bmatrix} = \begin{bmatrix} S_k & C_k \\ -C_k & S_k \end{bmatrix} \cdot \begin{bmatrix} \tilde{H}_k \\ \tilde{H}_{N-k} \end{bmatrix}, k = 0, 1, \ldots, \frac{N}{2} - 1,$$

$$\hat{Y}_k = \hat{Y}_{k,R} + j\hat{Y}_{k,I}$$

said error estimation operation being characterized by equation:

$$E_k = X_k - \hat{Y}_k, k = 0, 1, \ldots, \frac{N}{2} - 1, \text{ and}$$

said coefficient updating operation being characterized by equation:

$$\begin{bmatrix} S_k(n+1) \\ C_k(n+1) \end{bmatrix} = \begin{bmatrix} S_k(n) \\ C_k(n) \end{bmatrix} + \mu_k \cdot M(\tilde{H}_k, \tilde{H}_{N-k}, E_k), k = 0, 1, \ldots, \frac{N}{2} - 1,$$

where M is a matrix operator involving $E_k$, $\tilde{H}_k$ and $\tilde{H}_{N-k}$, $\tilde{H}_k$ and $\tilde{H}_{N-k}$ are the k-th and (N-k)-th subchannels output from said DHT operator, $X_k$ is the training symbol of the k-th subchannel of said DMT system, $\hat{Y}_k$ is the k-th subchannel output from said DHT-based FEQ operator, $\mu_k$ is the updating step-size of said DHT-based FEQ operator, and $S_k$ and $C_k$ are coefficients.

7. The receiver according to claim 6, wherein said coefficients $S_k$ and $C_k$ are derived from the coefficient $W_k$ of a discrete Fourier transform (DFT)-based FEQ as follows:

$$S_k = \frac{W_{k,R} - W_{k,I}}{2}; \text{ and}$$

$$C_k = \frac{W_{k,R} + W_{k,I}}{2}.$$

8. The receiver according to claim 6, wherein said matrix operator M is:

$$\begin{bmatrix} \tilde{H}_k E_{k,R} + \tilde{H}_{N-k} E_{k,I} \\ \tilde{H}_{N-k} E_{k,R} + \tilde{H}_k E_{k,I} \end{bmatrix}.$$

9. The receiver according to claim 6, wherein said matrix operator M is:

$$\begin{bmatrix} \tilde{H}_k \cdot sgn(E_{k,R}) + \tilde{H}_{N-k} \cdot sgn(E_{k,I}) \\ \tilde{H}_{N-k} \cdot sgn(E_{k,R}) + \tilde{H}_k \cdot sgn(E_{k,I}) \end{bmatrix},$$

where sgn(x) is an x's quantized value, which represents a +1 if $x \geq 0$ and −1 if x<0.

10. A discrete Hartley transform (DHT)-based frequency-domain equalizer (FEQ) of a receiver of a N (N>1)-point discrete multi-tone (DMT) system whose transmitter performs an inversed discrete Fourier transform (IDFT) operation for modulation, said receiver having a DHT operator for demodulation, said DHT-based FEQ following said DHT operator and comprising three operations: filtering, error estimation, and coefficient updating, said filtering operation being characterized by equation:

$$\begin{bmatrix} \hat{Y}_{k,R} \\ \hat{Y}_{k,I} \end{bmatrix} = \begin{bmatrix} S_k & C_k \\ -C_k & S_k \end{bmatrix} \cdot \begin{bmatrix} \tilde{H}_k \\ \tilde{H}_{N-k} \end{bmatrix}, k = 0, 1, \ldots, \frac{N}{2} - 1,$$

$$\hat{Y}_k = \hat{Y}_{k,R} + j\hat{Y}_{k,I}$$

said error estimation operation being characterized by equation:

$$E_k = X_k - \hat{Y}_k, k = 0, 1, \ldots, \frac{N}{2} - 1, \text{ and}$$

said coefficient updating operation being characterized by equation:

$$\begin{bmatrix} S_k(n+1) \\ C_k(n+1) \end{bmatrix} = \begin{bmatrix} S_k(n) \\ C_k(n) \end{bmatrix} + \mu_k \cdot M(\tilde{H}_k, \tilde{H}_{N-k}, E_k),$$

$$k = 0, 1, \ldots, \frac{N}{2} - 1,$$

where M is a matrix operator involving $E_k$, $\tilde{H}_k$ and $\tilde{H}_{N-k}$, $\tilde{H}_k$ and $\tilde{H}_{N-k}$ are the k-th and (N-k)-th subchannels output from said DHT operator, $X_k$ is the training symbol of the k-th subchannel of said DMT system, $\hat{Y}_k$ is the k-th subchannel output from said DHT-based FEQ operator, $\mu_k$ is the updating step-size of said DHT-based FEQ operator, and $S_k$ and $C_k$ are coefficients.

11. The DHT-based FEQ according to claim 10, wherein said coefficients $S_k$ and $C_k$ are derived from the coefficient $W_k$ of a discrete Fourier transform (DFT)-based FEQ as follows:

$$S_k = \frac{W_{k,R} - W_{k,I}}{2}; \text{ and}$$

$$C_k = \frac{W_{k,R} + W_{k,I}}{2}.$$

12. The DHT-based FEQ according to claim 10, wherein said matrix operator M is:

$$\begin{bmatrix} \tilde{H}_k E_{k,R} + \tilde{H}_{N-k} E_{k,I} \\ \tilde{H}_{N-k} E_{k,R} + \tilde{H}_k E_{k,I} \end{bmatrix}.$$

13. The DHT-based FEQ according to claim 10, wherein said matrix operator M is:

$$\begin{bmatrix} \tilde{H}_k \cdot sgn(E_{k,R}) + \tilde{H}_{N-k} \cdot sgn(E_{k,I}) \\ \tilde{H}_{N-k} \cdot sgn(E_{k,R}) + \tilde{H}_k \cdot sgn(E_{k,I}) \end{bmatrix},$$

where sgn(x) is an x's quantized value, which represents a +1 if $x \geq 0$ and −1 if x<0.

* * * * *